J. B. AATILA.
REINFORCED WOODEN BEAM.
APPLICATION FILED FEB. 21, 1918.
1,368,594.
Patented Feb. 15, 1921.
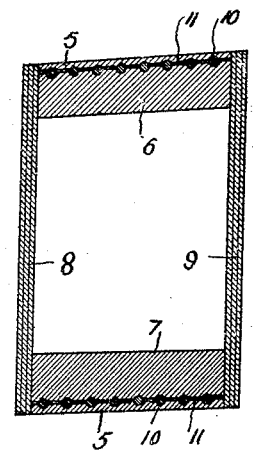
INVENTOR:
Julle B. Aatila,
BY
Chamberlin Freudenreich,
ATTORNEYS.

UNITED STATES PATENT OFFICE.

JULLE B. AATILA, OF CHICAGO, ILLINOIS, ASSIGNOR TO HASKELITE MFG. CORPORATION, A CORPORATION OF NEW YORK.

REINFORCED WOODEN BEAM.

1,368,594.  Specification of Letters Patent.  Patented Feb. 15, 1921.

Application filed February 21, 1918. Serial No. 218,440.

*To all whom it may concern:*

Be it known that I, JULLE B. AATILA, a citizen of Finland, residing at Chicago, county of Cook, State of Illinois, have invented a certain new and useful Improvement in Reinforced Wooden Beams, and declare the following to be a full, clear, and exact description of the same, such as will enable others skilled in the art to which it pertains to make and use the same, reference being had to the accompanying drawings, which form a part of this specification.

It is often the case, as for example in beams for use in the wings of airplanes, that the requisite strength of a beam must be reached under limitations of height and of weight, while practical considerations may limit the breadth or width, also. The usual design of beam for use in the wings of airplanes is one in which a piece of solid wood is fashioned so as to make it an I-beam. The material which is removed to produce the web greatly reduces the weight at the expense of a loss of material which, because close to the neutral axis, possesses small capacity for resisting bending stresses. If greater strength be desired in a beam of this kind without increasing the height or depth of the beam, it can be accomplished only by widening the flanges or adding material on the faces closest to the neutral axis. If the width of the beam is limited, the added strength cannot be supplied by widening the flanges, so that the only method left open is to add material to the inner sides of the flanges where it has heretofore been removed in order to make the web. The same considerations apply to the built-up wooden beam of the type disclosed in my prior application Serial No. 215,267, filed February 4, 1918.

The object of the present invention is to produce a construction and arrangment in which, by the addition of metal to a wooden beam in a simple manner, greatly increased strength will result from the addition of a comparatively small mass of material.

Viewed in another of its aspects my invention may be said to have for its object to produce a composite wood and metal beam which may be caused to have considerably greater strength for a given weight and given cross sectional dimensions than would be possible, in many cases, if wood alone were used.

The various features of novelty whereby my invention is characterized will hereinafter be pointed out with particularity in the claims; but, for a full understanding of my invention and of its objects and advantages, reference may be had to the following detailed description taken in connection with the accompanying drawing which is a cross section through a built-up beam reinforced in accordance with the present invention.

Referring to the drawing, 6 and 7 represent comparatively thick slab-like upper and lower flanges or chords connected together by comparatively thin parallel webs, 8, and 9, of laminated veneer so as to produce a box-like wooden beam. Upon the outer faces of the flanges, that is the faces farthest removed from the neutral axis, I lay a metal reinforcement which may take any one of a variety of forms. In the arrangement shown the metal reinforcement consists of grids made up of longitudinal wires, 10, and cross wires, 11. In order to make the metal effective it is necessary that it be joined to the wood so as effectively to resist the shearing stresses at the surface of the metal and exerted in the direction of its length, commonly called "bond stresses." This bonding of the metal to the wood can conveniently be accomplished by placing the metal between the flanges of the beam and sheets or layers, 5, of wood; the sheets or layers 5 being cemented to the faces of the flanges, preferably under heavy pressure so that the metal will be for all practical purposes completely surrounded by the wood. Then, if the metal reinforcement is in the form of wires or rods of comparatively small diameter, the metal as a whole will present a surface of large area in contact with the wood and therefore an effective union to resist the "bond stresses" will result.

In the case of small beams the members 5 may be of thin veneer in any desired number of layers, a single layer being in some cases sufficient, particularly where the wires are fine. Where only a single layer of veneering is used the grain should extend in the direction of the length of the beam.

The longitudinal wires may be joined together or not, as may be desired. For convenience of manufacture it will probably be advisable to tie the longitudinal wires together by means of cross wires and, if this is done, advantage may be taken thereof to increase the strength of the bond between the metal reinforcement and the wood.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. A hollow wooden beam having thick upper and lower chords and thin laminated connecting webs, longitudinal wires engaging the outer faces of said upper and lower chords, and holding layers overlying said wires and glued or cemented thereto and to the said outer faces of the upper and lower chords.

2. A hollow wooden beam comprising thick slab-like solid upper and lower chords and thin laminated connecting webs, metal tension and compression members lying against the outer faces of said upper and lower chords, and holding members in the form of sheets or layers of wood overlying the metal members and glued or cemented thereto and to the adjacent faces of said upper and lower chords.

3. A hollow rectangular wooden beam comprising thick slab-like solid upper and lower flanges or chords and thin parallel flat connecting webs of laminated wood veneer extending between the same, metal tension and compression members lying against the outer faces of said upper and lower chords, and holding layers overlying said tension and compression members and cemented to said outer faces of said upper and lower chords.

4. A hollow rectangular wooden beam comprising thick slab-like solid upper and lower flanges or chords and thin parallel flat connecting webs of laminated wood veneer extending between the same, and metal tension and compression members lying against the outer faces of said upper and lower chords.

In testimony whereof, I sign this specification.

JULLE B. AATILA.